United States Patent [19]
Osteen

[11] 3,782,056
[45] Jan. 1, 1974

[54] JOINT STRUCTURE
[75] Inventor: Mitchell M. Osteen, Zirconia, N.C.
[73] Assignee: General Electric Company
[22] Filed: Apr. 27, 1972
[21] Appl. No.: 247,959

[52] U.S. Cl. .............................. 52/758 F, 85/41
[51] Int. Cl. .............................................. F16b 5/00
[58] Field of Search ............... 287/189.36 F; 85/41,
85/47, 32 V; 10/1 B, 1 R; 29/526, 432

[56] References Cited
UNITED STATES PATENTS
3,221,588  12/1965  Wieber .................. 287/189.36 F
1,946,931  2/1934   Chong .................................. 10/1 B
3,168,171  2/1965   Gaare ................................. 85/32 V 3,578,762  5/1971  Orange & Kolec ..................... 85/41

Primary Examiner—James R. Boler
Assistant Examiner—Conrad L. Berman
Attorney—Sidney Greenberg et al.

[57]  ABSTRACT

Joint formed by superposed members fastened together by a self-drilling, self-tapping screw is provided with a recess in the surface of the member where the screw exits. The recess provides space for receiving the shavings produced by the drill end of the screw while the portion of the joint member adjacent the recess is threadably engaged by the self-tapping portion of the screw to provide increased holding strength for the screw.

6 Claims, 5 Drawing Figures

PATENTED JAN 1 1974 3,782,056

JOINT STRUCTURE

The present invention relates to joint structures and particularly to a joint structure fastened by a selfdrilling, self-tapping screw.

It is an object of the invention to provide for joint structures having increased thickness which can be effectively fastened by screws of the above type.

It is a particular object of the invention to provide for joint structures of the above type wherein shavings produced by the drill portion of the screw do not hinder the operation of the tapping portion of the screw.

Other objects and advantages will become apparent from the following description and the appended claims.

With the above objects in view, the present invention relates to a joint structure comprising, in combination, first and second superposed members, and a screw passing through and fastening the superposed members together, the screw having a shank formed at one end with a head arranged adjacent the first member, with a drilling portion at its other end, and with a tapping portion between the head and the drilling portion, the second member being formed at its surface adjacent the other end of the screw with a recess, the tapping portion of the screw intersecting the recess and being at least partially in threaded engagement with the second member adjacent the recess.

The invention will be better understood from the following description taken in conjunction with the accompanying drawing, in which.

Figure 3:
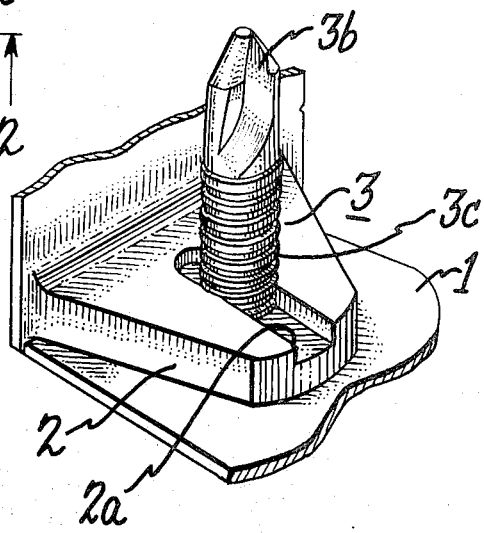
FIG. 3 is a perspective view of the joint structure of FIG. 1.

Referring now to the drawing, and particularly to FIG. 3, there is shown a joint structure comprising a bottom member 1 and an upper member 2 superposed on one another and fastened together with a self-drilling, self-tapping screw 3. Typically, top member 2 is made of a relatively soft metal such as aluminum, copper, zinc, lead or the like, whereas bottom member 1 may be of any desired type of material including metal, plastic, wood, ceramic, rubber, cardboard, etc.

Self-drilling screw 3 is of known type which has been extensively used heretofore for dispensing with the need to drill tap holes in metal members before use of screws therein. In such prior use, however, the drill screw has been employed with materials whose thickness does not exceed the length of the drill portion of the screw, since once the threads of the tapping portion of the screw begin to engage the material, it is necessary that additional shavings from the drilling action not be produced because such shavings impede the action of the tapping portion of the screw. Thus, the threaded engagement of the screw with the tapped member is limited to the number of thread turns included in a length equal to that of the drill portion in conventional applications. However, when a relatively soft material such as aluminum is to be threadably engaged, it is often desirable to have a greater length of threaded engagement than is possible in such prior applications using materials of limited thickness.

In accordance with the present invention, materials of substantially greater thickness can be used for providing increased threaded engagement of the tapping portion of the drill screw while avoiding interference by the drill shavings with the tapping action of the screw. For this purpose there is provided in the upper joint member 2, as seen in FIG. 3, a recess or slot 2a in the surface region thereof where the drill portion 3b of screw 3 exits so that screw 3 intersects slot 2a. The width of slot 2a is slightly less than the outer diameter of the threaded portion 3c of the screw, so that the latter portion effectively threadably engages the walls of slot 2a. Shavings produced by drill portion 3b as it penetrates member 2 are discharged through slot 2a, which has a dimension larger than the diameter of the screw shank, and thus the shavings do not impede the tapping action of the screw. As will be seen, the thickness of member 2 in the region penetrated by the screw is not greater than the length of drill portion 3b, so as to avoid the difficulty mentioned above.

Figure 1:
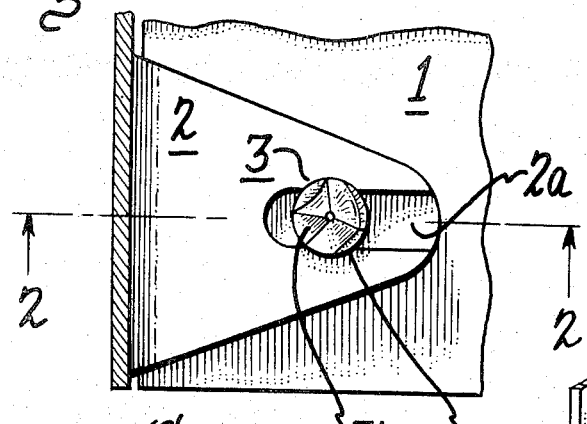
FIG. 1 is a plan view of a joint structure embodying the invention.
Figure 2:
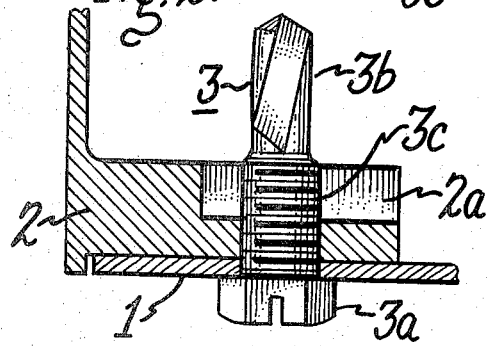
FIG. 2 is a cross-sectional view of the joint structure of FIG. 1 taken along the line 2 — 2.
Figure 4:
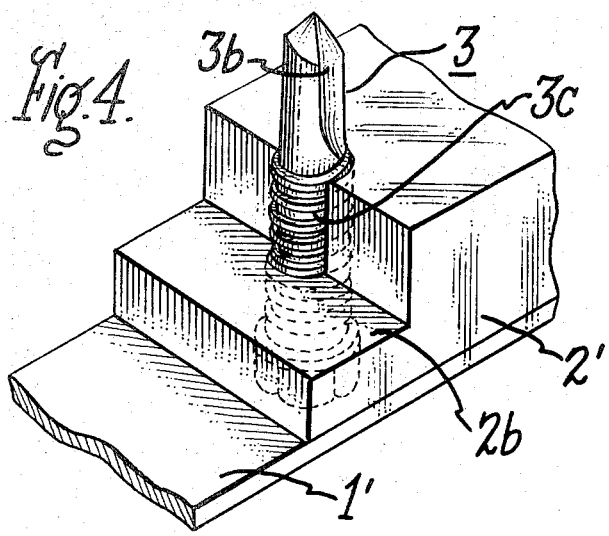
FIG. 4 is a perspective view of another embodiment of the joint structure of the invention.

FIG. 4 shows another embodiment of the invention, wherein the recess 2b in the upper member 2' is in the form of a step, rather than a slot as in the FIG. 1 embodiment. In this arrangement, screw 3 penetrates member 2' adjacent recess 2b while intersecting the latter so that the tapping portion 3c threadably engages the additional thickness of member 2' only partially around its circumference.

Figure 5:
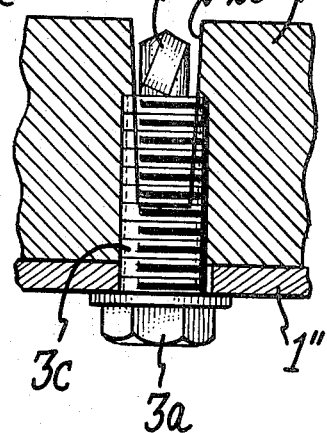
FIG. 5 is a cross-sectional view of still another embodiment of the invention.

In the embodiment shown in FIG. 5, the recess for receiving the drill shavings is in the form of a hole 2c extending part way into member 2'' from its top surface in the region penetrated by screw 3. The diameter of hole 2c is slightly greater than the diameter of drill portion 3b but slightly smaller than that of tapping portion 3c, so that hole 2c provides space for discharge of the drill shavings while enabling the tapping portion 3c of the screw to effectively threadably engage the walls defining the hole, as shown.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by letters Patent of the United States is:

1. Joint structure comprising, in combination, first and second superposed members, and a screw passing through and fastening said superposed members together, said screw comprising a shank having a head at one end adjacent said first member, a drilling portion at the other end, and a tapping portion between said head and said drilling portions, said first and second members having aligned holes formed therein by said drilling portion, said second member being formed at its surface adjacent said other end of said screw with a recess having a lateral dimension larger than the diameter of said drilling portion of said screw, the tapping portion of said screw intersecting said recess and being at least partially in threaded engagement with at least one side wall of said recess in said second member, the thickness of said second member at said recess being less than the thickness thereof adjacent said recess, said tapping portion of said screw passing through said aligned holes in said first and second members.

2. Joint structure as defined in claim 1, the thickness of said second member at said recess being not greater than the length of said drilling portion of said screw.

3. Joint structure as defined in claim 2, said recess being in the form of a slot extending along the outer surface of said second member and being slightly narrower than the outer diameter of said tapping portion of said screw, said tapping portion threadably engaging opposite sides of said slot.

4. Joint structure as defined in claim 2, said recess being formed by a step in said second member having a wall portion extending transverse said surface of said second member, said tapping portion of said screw intersecting said recess and being in threaded engagement with said wall portion partially around its circumference.

5. Joint structure as defined in claim 2, the length of said tapping portion of said screw being equal to at least about the overall thickness of said second member.

6. Joint structure as defined in claim 2, said recess being a hole extending partially into said second member and receiving said other end of said screw, the diameter of said hole being slightly greater than the diameter of said drilling portion and slightly smaller than the diameter of said tapping portion of said screw for threadably engaging the latter portion.

* * * * *